May 12, 1942.   E. L. HOFFMAN ET AL   2,282,407
PARACHUTE
Filed May 14, 1941
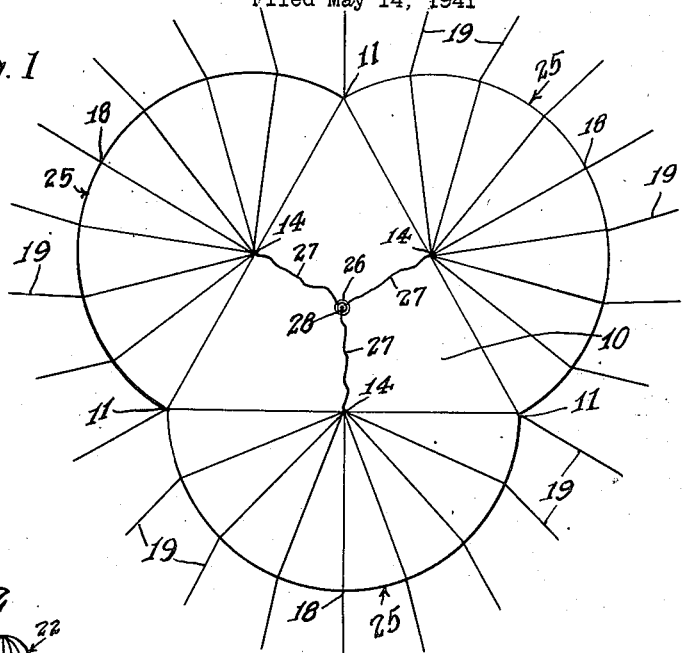
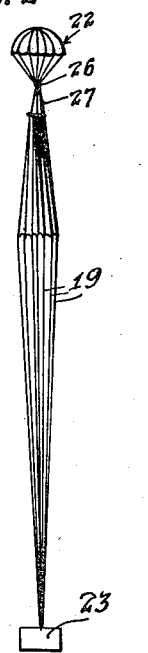
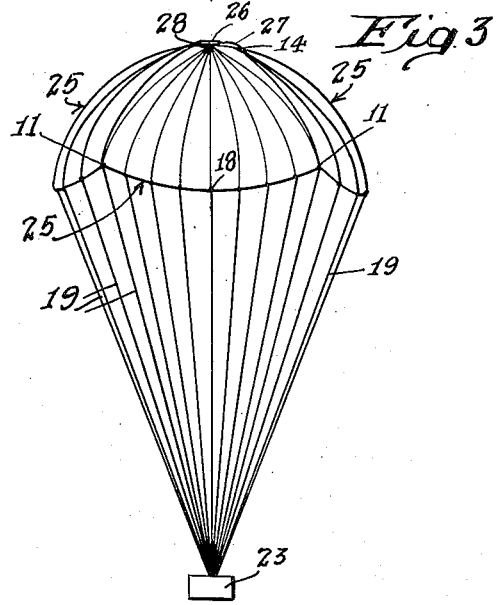
Inventors
Edward L. Hoffman
James M. Russell
By Lyon & Lyon
Attorneys Patented May 12, 1942

2,282,407

UNITED STATES PATENT OFFICE 2,282,407

PARACHUTE

Edward L. Hoffman and James M. Russell, San Diego, Calif., assignors to Standard Parachute Corporation, San Diego, Calif., a corporation of California Application May 14, 1941, Serial No. 393,386

8 Claims. (Cl. 244—145)

This invention relates to parachutes for all purposes, and particularly to large parachutes for lowering any and all types of loads.

Heretofore, with few exceptions, the parachutes employed have used canopies that when stretched flat were circular in shape or in the form of a symmetrical polygon, with suspension lines symmetrically circumferentially distributed around the edge of the canopy and all of the same length. Such parachutes have had the inherent defect that while descending through the air they invariably oscillate or swing like a pendulum. This oscillation is very undesirable and can be dangerous when carrying human cargo, as parachute jumpers have landed during a backward oscillation with fatal results. Aside from the danger of an oscillating parachute, the oscillation increases the rate of descent, a parachute falling more rapidly when the load is displaced in any direction from the normal vertical position.

A primary object of the present invention is to provide a parachute that is either immune to, or much less subject to, oscillation than the standard parachute construction.

Another object is to provide a parachute construction which provides a relatively low rate of descent for a given cloth area.

Another object is to provide a parachute achieving the foregoing objects that is relatively immune to fouling when it opens.

The manner in which the foregoing objects are achieved, together with other objects and features of the invention, will become apparent from the detailed description to follow of a preferred embodiment of the invention, as disclosed in the drawing, in which Fig. 1 is a plan view of the canopy of a parachute in accordance with the invention, shown spread out flat;

Fig. 2 is a side elevation of a parachute in accordance with the invention, stretched between the pilot parachute and a load, just prior to opening; and Fig. 3 is a side elevation of the parachute as it appears when fully extended, during descent.

Referring first to Fig. 1, the parachute has a canopy that may be conveniently referred to as of "three-leaf clover" shape. It includes a central section 10 in the form of an equilateral triangle having apexes 11, 11, 11, respectively. Extending from each side of the triangular portion 10 is a substantially semicircular portion 25, the curved edges of the semicircular sections constituting the margin of the canopy.

The suspension lines 19 extend from the margins of the semicircular sections 25 at uniformly spaced points thereon. The suspension lines may, if desired, be extended radially along the semicircular sections 25 to the centers of curvature thereof, indicated at 14, 14, 14. This construction is not essential, however, and under some conditions the suspension lines 19 may be secured to the canopy only at the edge thereof, or extended radially to the center 28.

For the purpose of opening the parachute, we provide a ring 26 which is secured by three lines 27, 27, 27, all of equal length, to the canopy at the three points 14, 14, 14, respectively. This ring 26 is intended to be connected to the pilot parachute or static line, depending upon the type of service in which the parachute is to be employed.

The suspension lines 19 are all of equal length from their points of attachment at the edge of the canopy. Furthermore, it will be observed from Fig. 1 that the points on the edge of the canopy are spaced the same distance from the center of curvature 14 of the adjacent lobe 25. In addition, the three bridle lines 27 are of the same length. Therefore, if the parachute is stretched between the ring 26 and a load 23, as shown in Fig. 2, all of the shrouds or suspension lines 19 will be stretched equally taut. In Fig. 2 the ring 26 is shown suspended by a pilot chute 22.

Under the conditions described, the three points 14, 14, 14, where the bridle lines 27 are connected, come together so that the straight line distance from the ring 26 to all points on the edge of the canopy, is equal. Since the shroud lines are all of equal length, the paths of tension along the different shroud lines from the load 23 to the ring 26 are of equal length.

This construction, whereby all of the shroud lines are in equal tension when the parachute is stretched as shown in Fig. 2, is very important, as it makes it practically impossible for parts of the canopy to be blown inside out, as could readily happen if certain lower portions of the skirt were so constructed that they extended closer to the load 23 than did other portions. In parachutes having such lower or hanging portions, the latter can readily be inflated in the improper direction and blown through the rigging inside out, so that they become torn during the inflation process.

When the canopy is fully distended, as shown in Fig. 3, the bridle ring 26 and lines 27, together with the pilot chute if there is one, are inactive and lie loosely upon the canopy. The bridle lines 27 are of sufficient length so that they do not interfere with the distention of the canopy in response to the air force thereagainst. Therefore during free descent the canopy assumes the same shape that it would if the bridle ring 26 and lines 27 were not present.

It will be observed that whereas the distance from any point on the edge of the canopy to the nearest one of the three lobe centers 14 is the same, the distance from all points of attachment of the shrouds 19 to the center 28 of the canopy is not the same. Thus the distance from a shroud attachment 18 adjacent the midportion of one of the lobes 25 to the center 28 of the canopy is substantially greater than the distance from one of the points 11 to the center 28. In other words, the distance 28, 14, 18, 23 (Figs. 1 and 3) is greater than the distance 28, 11, 23. Therefore the points 11, 11, 11 on the edge of the canopy are indented or pulled radially in toward the vertical axis of the inflated parachute (Fig. 3) as compared to the tips 18 of the lobes 25. Furthermore, the points 18 extend below the level of the indented portions 11, as clearly shown in Fig. 3. This arrangment provides constant air spillage at the points 11, 11, 11 and expands the points 18, 18, 18. It is important to note that each of the points 18 is diametrically opposite one of the indented points 11. This functions to flatten the top and produce more projected area and hence greater lift. At the same time the points 18, 18, 18 balance the canopy against the tipping effect set up by the air spillage at the points 11.

The construction described does not require the usual aperture at the center of the canopy for air spillage and this functions to increase the efficiency of the parachute by lowering the rate of descent with a given load and a given cloth area in the canopy. Slow descent is further produced by the fact that the lobular portions open out further than the indented portions.

The length of the shrouds relative to the dimensions of the canopy is not critical and may be in accordance with standard parachute construction.

We have found by actual tests that a parachute in accordance with our invention descends approximately 10% slower than a parachute of standard construction of the same area. For example, an ordinary 24-foot standard parachute with a 160-pound load descends approximately 21 feet per second as against 18.9 feet per second for one of our parachutes with the same load and the same cloth area.

It is possible to achieve some of the advantages of the invention, using more than three lobes, but we find that in order to achieve the maximum reduction in oscillation an odd number of lobes should be employed. In general, three lobes have proved the most satisfactory.

We have found that the use of the canopy having an odd number of lobes as described, not only yields a lower rate of descent than is obtainable from the same cloth area with standard construction, but that there is less variation in the rate of descent with our construction than with the customary construction.

It is to be understood that although in the drawing we show the lobes 25 of semicircular shape, it is not essential that they be of this exact construction. It is necessary that the outer margins of the lobes be arcuate about a common center if the advantages of applying equal tension to all the shrouds when the parachute is in the position of Fig. 2, are to be obtained. However, the advantages of nonoscillation and slow descent can be obtained without having the margin of each lobe arcuate about a single center. The important feature in obtaining nonoscillation is to provide a construction that produces an odd number of lobes during descent.

Various departures can be made from the exact construction shown and described, while still utilizing the principles and advantages of our invention, and the latter is, therefore, to be limited only to the extent set forth in the appended claims.

We claim:

1. A parachute comprising a canopy, load-attachment means, and shroud lines connecting the margins of the canopy to the load-attachment means; in which the paths from the load-attachment means along the shroud lines to the margin of the canopy and thence along the surface of the canopy along a direct line to the center thereof are of different lengths for different groups of shroud lines, whereby those marginal portions of the canopy adjacent the long paths are capable of greater radial distention than are those lateral extensions adjacent the short paths, the lengths of the different paths along successive shroud lines varying in length cyclically to define an odd number of paths of maximum length symmetrically spaced about the center of the canopy.

2. A parachute comprising a canopy, load-attachment means, shroud lines connecting the margin of the canopy to the load-attachment means and suspension means for supporting said canopy vertically above said load-attachment means during opening thereof; in which the paths from the load-attachment means along the shroud lines to the margin of the canopy and thence along the surface of the canopy to the center thereof are of different lengths for different groups of shroud lines, whereby those marginal portions of the canopy adjacent the long paths are capable of greater radial distention than are those marginal portions adjacent the short paths, and means connecting said suspension means to said canopy at a plurality of points, each of which is so located on said canopy that all paths from said load-attachment means along the different shroud lines to the margin of the canopy and thence along the canopy to the nearest one of said points, are of the same length.

3. A parachute as described in claim 2, in which all said shroud lines are of the same length.

4. A parachute as described in claim 2, in which the margin of the canopy consists of arcuate lobes, the respective centers of curvature of which constitute said points of connection to said suspension means.

5. A parachute as described in claim 1, in which said shroud lines are of equal length from the margin of the canopy, and the canopy is lobular in shape.

6. A parachute comprising a fabric canopy, shroud lines, and load-attachment means; said canopy comprising a flat polygonal piece and a plurality of lobes, each lobe bounded by a curved side and a straight side and merging at its straight side with the corresponding straight side of said polygonal piece, said shroud lines being of equal length and attached to the periphery of the canopy and converging to a point of attachment to said load-attachment means.

7. A parachute comprising a fabric canopy, shroud lines and load-attachment means and a bridle; said canopy comprising a flat polygonal piece and a plurality of lobes, each lobe bounded by an arcuate side and a straight side, each of said lobes being attached along its straight side to a corresponding straight side of said polygonal piece, said shroud lines being of equal length and attached to and extending radially from points midway of each said straight side of the polygonal piece outwardly to the periphery of the canopy and thence converging to a point of attachment to said load-attachment means, said bridle comprising an attachment means and lines of equal length attached to said last mentioned means and attached one to each said point midway of the straight sides of said polygonal piece.

8. A parachute as defined by claim 7, in which said lobes are semicircular pieces of material.

EDWARD L. HOFFMAN.
JAMES M. RUSSELL.